United States Patent
Hill

[19]

[11] Patent Number: 5,813,696
[45] Date of Patent: Sep. 29, 1998

[54] AIR BAG WITH TETHER

[75] Inventor: Bruce R. Hill, Bloomfield Hills, Mich.

[73] Assignee: TRW Vehicle Safety Systems Inc., Lyndhurst, Ohio

[21] Appl. No.: 738,472

[22] Filed: Oct. 28, 1996

[51] Int. Cl.[6] .................................................. B60R 21/16
[52] U.S. Cl. ....................................................... 280/743.2
[58] Field of Search ............................ 280/743.2, 743.1, 280/732, 730.1, 728.1, 729

[56] References Cited

U.S. PATENT DOCUMENTS

| | | | |
|---|---|---|---|
| 5,308,113 | 5/1994 | Moriset .................................. | 280/743.2 |
| 5,362,101 | 11/1994 | Sugiura et al. ....................... | 280/743.2 |
| 5,489,119 | 2/1996 | Prescaro et al. ...................... | 280/743.2 |
| 5,498,023 | 3/1996 | Adams et al. ......................... | 280/728.2 |
| 5,498,031 | 3/1996 | Kosugi .................................. | 280/743.2 |
| 5,568,838 | 10/1996 | Lindstrom ............................. | 280/743.2 |
| 5,678,858 | 10/1997 | Nakayama et al. ................... | 280/743.2 |

FOREIGN PATENT DOCUMENTS

| | | | |
|---|---|---|---|
| 1438032 | 6/1976 | United Kingdom ................. | 280/743.2 |

*Primary Examiner*—Peter C. English
*Attorney, Agent, or Firm*—Tarolli, Sundheim, Covell, Tummino & Szabo

[57] ABSTRACT

An air bag module (10) includes an air bag (30) having a base portion (40) and a body portion (42) connected with the base portion. An elongate tether (60) for controlling inflation of the body portion (42) of the air bag (30) has an intermediate portion (90) sewn to one of the portions (40, 42) of the air bag and has first and second end portions (78, 88) sewn to the other of the portions of the air bag. A shorter portion (70) of the tether (60) extends in a first direction from the intermediate portion (90) of the tether and includes the first end portion (78) of the tether. A longer portion (80) of the tether (60) extends in a second direction from the intermediate portion (90) of the tether and includes the second end portion (88) of the tether. The air bag (30) has a partially inflated condition in which the shorter portion (70) of the tether (60) is extended and resists movement of the body portion (42) of the air bag away from the base portion (40). The shorter portion (70) of the tether (60) is rupturable under the force of the inflating air bag (30) to enable movement of the air bag from the partially inflated condition to a fully inflated condition. The shorter portion (70) of the tether (60) is preferably narrower than the longer portion (80) of the tether.

8 Claims, 2 Drawing Sheets

AIR BAG WITH TETHER

BACKGROUND OF THE INVENTION

1. Technical Field

The present invention relates to a vehicle safety apparatus and, in particular, relates to an air bag module including an inflatable vehicle occupant protection device, such as an air bag, for helping to protect a vehicle occupant.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as the instrument panel or a vehicle seat, for example. In the event of an impact to the vehicle of a magnitude above the predetermined threshold, the inflator is actuated, and the air bag is inflated into a position between the vehicle occupant and the adjacent structure of the vehicle.

It is known to use one or more tethers in an air bag to control the inflation of the air bag. A tether typically is sewn between and extends between two spaced apart portions of the air bag to control the shape of the air bag when inflated.

SUMMARY OF THE INVENTION

The present invention is a vehicle safety apparatus comprising an inflatable vehicle occupant protection device having a base portion and having a body portion. The body portion is connected with the base portion and is inflatable in a direction away from the base portion into an inflated condition. The apparatus includes an elongate tether for controlling inflation of the body portion of the inflatable device. The tether has an intermediate portion sewn to one of the portions of the inflatable device and has first and second end portions sewn to the other of the portions of the inflatable device. A shorter portion of the tether extends in a first direction from the intermediate portion of the tether and includes the first end portion of the tether. A longer portion of the tether extends in a second direction from the intermediate portion of the tether and includes the second end portion of the tether. The inflatable device has a partially inflated condition in which the shorter portion of the tether is extended and resists movement of the body portion of the inflatable device away from the base portion. The shorter portion of the tether is rupturable under the force of the inflating inflatable device to enable movement of the inflatable device from the partially inflated condition to a fully inflated condition.

In a preferred embodiment, the shorter portion of the tether is narrower than the longer portion of the tether.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 3:
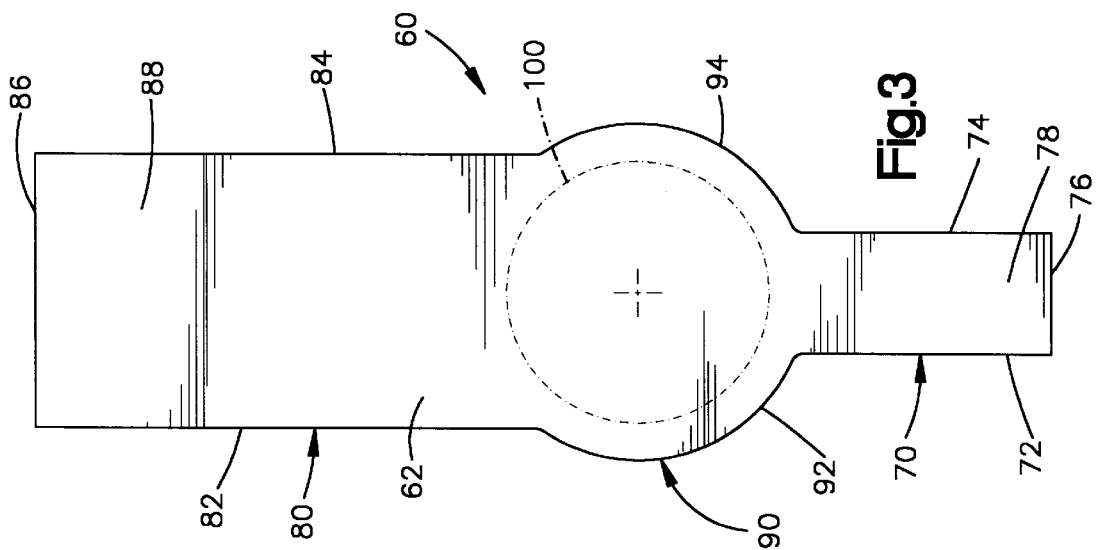
FIG. 3 is a plan view of a tether which forms part of the vehicle safety apparatus of FIG. 1.

The present invention relates to a vehicle safety apparatus and, in particular, relates to an air bag module including an inflatable vehicle occupant protection device, such as an air bag, for helping to protect a vehicle occupant. The present invention is applicable to various vehicle safety apparatus constructions. As representative of the present invention, FIGS. 1–3 illustrate a vehicle safety apparatus or air bag module 10.

Figure 1:
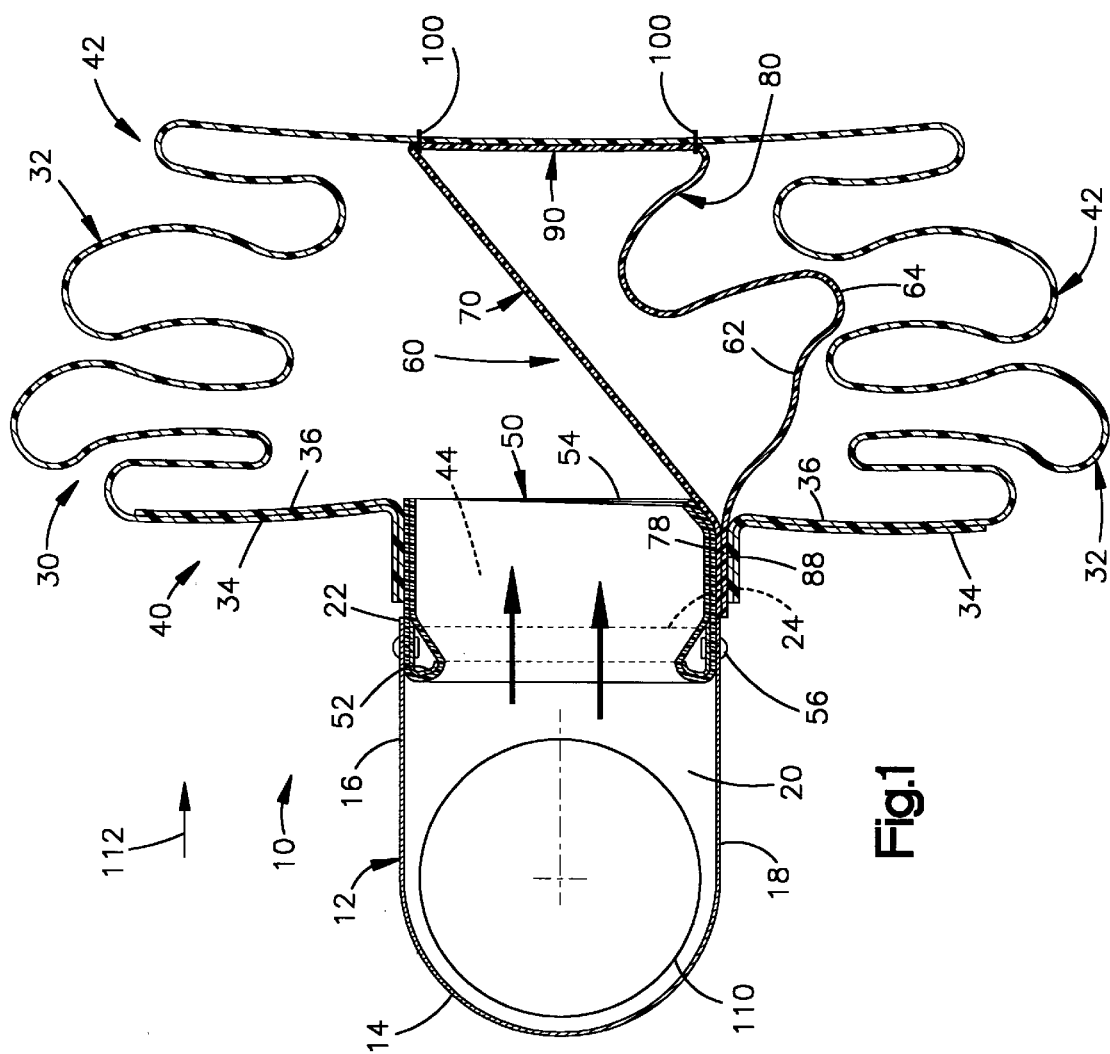
FIG. 1 is a sectional view of portions of a vehicle safety apparatus constructed in accordance with the present invention, including an air bag shown in a partially inflated condition.
Figure 2:
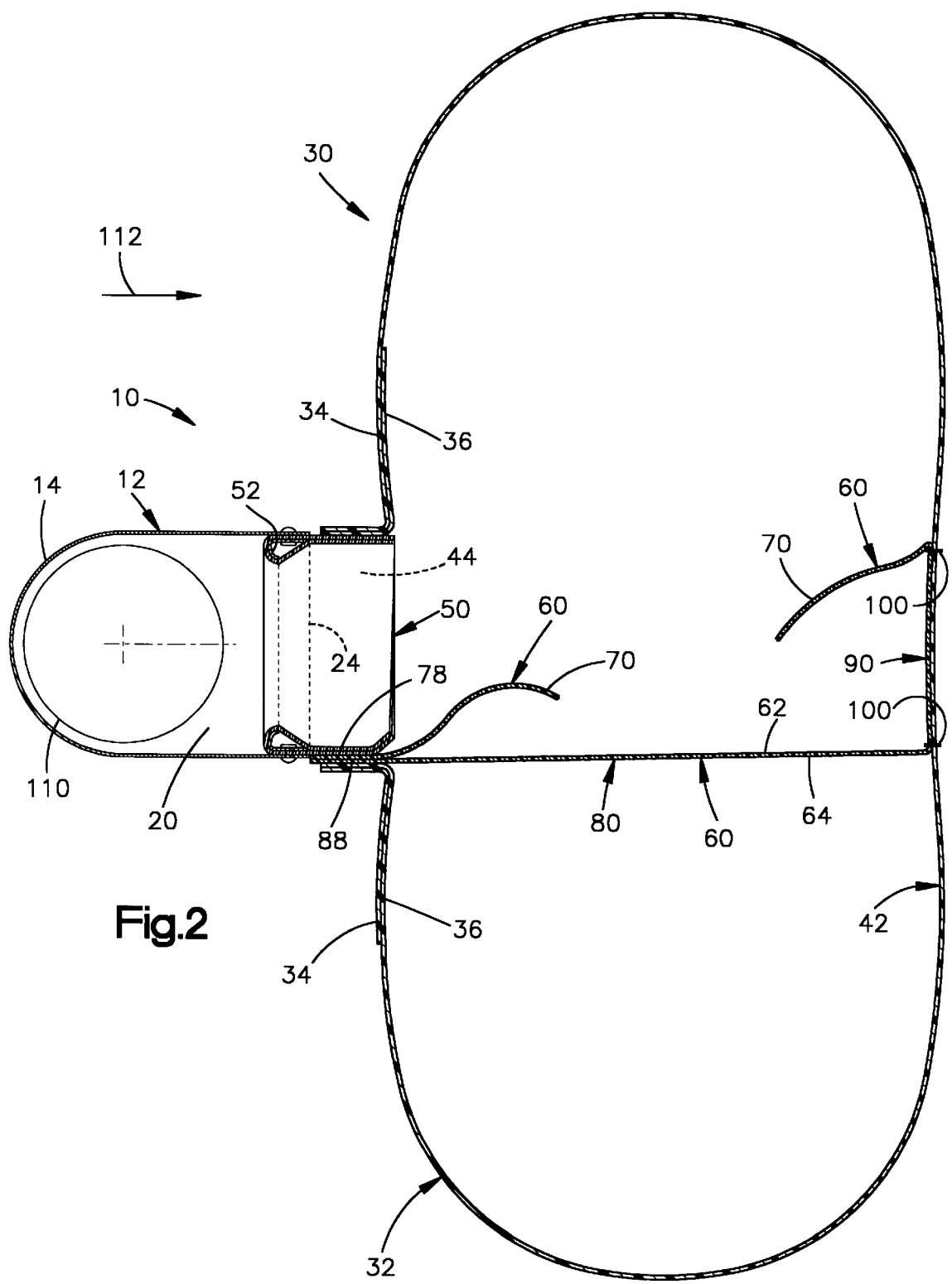
FIG. 2 a view similar to FIG. 1 showing the air bag in a fully inflated condition.

The air bag module 10 includes a reaction canister or container indicated schematically at 12 (FIG. 1). The container 12 is made from sheet metal and has a generally C-shaped configuration including an arcuate back wall 14 which extends between parallel upper and lower walls 16 and 18. The walls 14, 16 and 18 of the container 12 define a chamber 20 in the container. An outer edge portion 22 of the container 12 defines a deployment opening 24 in the container opposite the back wall 14.

The air bag module 10 includes an air bag 30. The air bag 30 is preferably made from a fabric material such as woven nylon. The air bag 30 can alternatively be made from non-woven material, such as plastic film. The use of plastic film, in particular, would require inflation fluid vents to be formed in the air bag, as is known in the art.

The air bag 30 (FIG. 2) is illustrated as a cylindrical air bag of the type commonly used for helping to protect a front seat passenger of a vehicle. The air bag 30 includes an elongate, generally rectangular center panel 32 having first and second opposite end portions 34 and 36. The first end portion 34 of the center panel 32 overlies the second end portion 36 of the center panel. Two generally circular side panels (not shown) are sewn to the center panel 32 to form the completed air bag 30.

The air bag 30 as thus sewn includes a mouth portion or base portion 40, and a body portion 42. The end portions 34 and 36 of the center panel 32 form a part of the base portion 40 of the air bag. The end portions 34 and 36 of the center panel 32 include respective openings which overlie each other to form an inflation fluid opening 44 in the air bag 30.

A tubular retainer assembly 50 is sewn to the base portion 40 of the air bag 30. The retainer assembly 50 includes a retaining ring 52 and a retainer panel 54. The retainer assembly 50 is secured in a known manner, such as by the rivets indicated at 56, to the container 12 adjacent the deployment opening 24 in the container.

The air bag module 10 includes a tether strap or tether 60. The tether 60 is made from a single piece of fabric material, such as woven nylon, and has an elongate configuration as best seen in FIG. 3. The tether 60 has first and second opposite major side surfaces 62 and 64 (FIGS. 1 and 2).

A first portion 70 (FIG. 3) of the tether 60 has a generally rectangular configuration including parallel first and second side edges 72 and 74 which are interconnected by an end edge 76. The first portion 70 of the tether 60 includes a first end portion 78 of the tether 60. A second portion 80 of the tether 60 has a generally rectangular configuration including parallel first and second side edges 82 and 84 which are interconnected by an end edge 86. The second portion 80 of the tether 60 includes a second end portion 88 of the tether.

An intermediate portion 90 of the tether 60 has a generally circular configuration as best seen in FIG. 3. The intermediate portion 90 of the tether 60 is disposed between the first portion 70 of the tether and the second portion 80 of the tether. The first portion 70 of the tether 60 extends in a first direction (downward as viewed in FIG. 3) from the intermediate portion 90 of the tether. The second portion 80 of the tether 60 extends in a second direction (upward as viewed in FIG. 3) from the intermediate portion of the tether.

The intermediate portion 90 of the tether 60 has an arcuate first side edge 92. The first side edge 92 extends between and interconnects the first side edge 72 of the first portion 70 of the tether 60 and the first side edge 82 of the second portion 80 of the tether. The intermediate portion 90 of the tether 60 has an arcuate second side edge 94. The second side edge 94 extends between and interconnects the second side edge 74 of the first portion 70 of the tether 60 and the second side edge 84 of the second portion 80 of the tether.

The first portion 70 of the tether 60 is narrower than the second portion 80 of the tether. That is, the distance between the side edges 72 and 74 of the first portion 70 of the tether 60 is less than the distance between the side edges 82 and 84 of the second portion 80 of the tether. The first portion 70 of the tether 60 is also shorter than the second portion 80 of the tether. That is, the distance between the intermediate portion 90 and the end edge 76 of the first portion 70 of the tether 60 is less than the distance between the intermediate portion and the end edge 86 of the second portion 80 of the tether.

The first portion 70 of the tether 60 is constructed to rupture at a selected point during inflation of the air bag 30, in a manner described below. Specifically, the first portion 70 of the tether 60 is designed to rupture when the tensile load on the first portion, acting between the intermediate portion 90 and the first end portion 78 of the tether, exceeds a predetermined threshold value. In the illustrated embodiment, the first portion 70 of the tether 60 has a relatively narrow width selected to ensure that the first portion of the tether ruptures under the predetermined tensile load.

The tether 60 is sewn between and extends between the base portion 40 of the air bag 30 and the body portion 42 of the air bag. The first and second end portions 78 and 88 of the tether 60 (FIG. 1) are sewn together with the retainer panel 54 and the base portion 40 of the air bag 30, at one side of the inflation fluid opening 44. The intermediate portion 90 of the tether 60 is sewn to the body portion 42 of the air bag 30 with a sew circle indicated schematically at 100.

One air bag 30 constructed in accordance with the present invention includes a tether 60 having a stitching section or sew circle 100 with a diameter of about 200 mm. The first portion 70 of the tether 60 has a length of about 200 mm from the sew circle 100 to the end edge 76 of the first portion. The second portion 80 of the tether 60 has a length of about 375 mm from the sew circle 100 to the end edge 86 of the second portion.

The air bag module 10 includes an inflator indicated schematically at 110. The inflator 110 is preferably an inflator which contains a stored quantity of pressurized inflation fluid and an ignitable material for heating the inflation fluid. The module 10 alternatively could include a pyrotechnic inflator which uses the combustion of gas-generating material to generate inflation fluid in the form of gas to inflate the air bag 30, or an inflator which contains only a stored quantity of pressurized inflation fluid for inflating the air bag.

The air bag module 10 also includes known actuation means (not shown) for sensing a collision involving the vehicle and for actuating the inflator 110 in response to the sensing of a collision. The actuation means may include a deceleration sensor and vehicle electric circuitry for actuating the inflator 110 in response to sensing a vehicle deceleration indicative of a vehicle collision having severity greater than a predetermined threshold value.

In the event of an impact to the vehicle of a magnitude greater than the predetermined threshold value, the actuation means provides an electrical signal over lead wires to the inflator 110. The inflator 110 is actuated in a known manner to direct inflation fluid under pressure into the chamber 20 in the container 12. The walls of the container 12 direct the inflation fluid through the deployment opening 24 in the container and into the inflation fluid opening 44 in the air bag 30. The inflation fluid flows through the base portion 40 of the air bag 30 into the body portion 42 of the air bag. The air bag 30 inflates from a folded, stored condition (not shown) to a partially inflated condition illustrated in FIG. 1, and then to a fully inflated condition illustrated in FIG. 2.

As the air bag 30 inflates, the body portion 42 of the air bag moves away from the base portion 40 of the air bag, in a direction indicated by the arrow 112 (to the right as viewed in FIG. 1). As the body portion 42 of the air bag 30 moves in the direction 112, the intermediate portion 90 of the tether 60, which is sewn to the center panel 32, moves away from the first and second end portions 78 and 88 of the tether 60.

The first portion 70 of the tether 60 extends to the condition shown in FIG. 1. When the first portion 70 of the tether 60 becomes fully extended as shown in FIG. 1, the force of the outwardly moving body portion 42 of the air bag 30 exerts a tensile load on the first portion of the tether.

The first portion 70 of the tether 60 resists movement of the body portion 42 of the air bag 30 in the direction 112, so long as the tensile load on the first portion of the tether is less than the predetermined amount. As a result, the tensioning of the first portion 70 of the tether 60 temporarily slows or stops movement of the body portion 42 of the air bag 30 away from the base portion 40. The length and width of the first portion 70 of the tether 60 are selected so that the body portion 42 of the air bag 30 is moving at a predetermined speed in the direction 112 when at a predetermined distance from the deployment opening 24 in the container 12.

As the air bag 30 continues to inflate, the tensile load on the first portion 70 of the tether 60 increases. The first portion 70 of the tether 60 ruptures, or breaks, when the tensile load on the first portion of the tether exceeds the predetermined threshold value. When the first portion 70 of the tether 60 ruptures, the intermediate portion 90 of the tether is again free to move away from the first and second end portions 78 and 88 of the tether. The second portion 80 of the tether 60 then extends to the condition shown in FIG. 2. When the second portion 80 of the tether 60 is fully extended as shown in FIG. 2, the force of the inflating air bag 30 is transmitted into the second portion of the tether. The second portion 80 of the tether 60 is constructed to be strong enough to resist this force and to remain unbroken during inflation of the air bag 30.

It should be understood that the tether 60 could be made in any one of a number of different manners. For example, the tether 60 could include two or more pieces of fabric material sewn together, end to end, to form the configuration shown in FIG. 3. Alternatively, a stress riser, or predetermined weakened portion, could be formed in the shorter portion of the tether.

From the above description of the invention; those skilled in the art will perceive improvements, changes and modifications in the invention. For example, the present invention could be used in conjunction with an air bag having a configuration other than a cylindrical configuration. Such improvements, changes and modifications within the skill of the art are intended to be covered by the appended claims.

Having described the invention, I claim:

1. A vehicle safety apparatus comprising:

an inflatable vehicle occupant protection device having a base portion and having a body portion connected with said base portion and inflatable in a direction away from said base portion into an inflated condition; and an elongate tether for controlling inflation of said body portion of said inflatable device;

said tether having an intermediate portion which has a generally circular configuration and which is sewn to said body portion of said inflatable device with a circular stitching section;

said tether having first and second end portions sewn to said base portion of said inflatable device;

said tether having a generally rectangular shorter portion extending in a first direction from said intermediate portion of said tether, said shorter portion of said tether including said first end portion of said tether;

said tether having a generally rectangular longer portion extending in a second direction from said intermediate portion of said tether, said longer portion of said tether including said second end portion of said tether, said longer portion of said tether being wider than said shorter portion of said tether and thereby having a greater tensile strength than said shorter portion of said tether;

said inflatable device having a partially inflated condition in which said shorter portion of said tether is extended and resists movement of said body portion of said inflatable device away from said base portion, said longer portion of said tether being unextended when said inflatable device is in the partially inflated condition;

said shorter portion of said tether being rupturable under the force of said inflating inflatable device to enable movement of said inflatable device from the partially inflated condition to a fully inflated condition in which said longer portion of said tether is extended and resists movement of said body portion of said inflatable device away from said base portion.

2. An apparatus as set forth in claim 1 wherein said circular stitching section has a diameter of about 200 millimeters.

3. An apparatus as set forth in claim 1 wherein said tether is made from a single piece of fabric material.

4. An apparatus as set forth in claim 1 wherein said circular stitching section has a diameter of about 200 millimeters and said tether is made from a single piece of fabric material.

5. An apparatus as set forth in claim 1 wherein said shorter portion of said tether extends from said intermediate portion at a first stitching location along said circular stitching section when said inflatable device is in the partially inflated condition, said longer portion of said tether extending from said intermediate portion of said tether at a second stitching location along said circular stitching section spaced apart from said first stitching location when said inflatable device is in the fully inflated condition.

6. An apparatus as set forth in claim 5 wherein said second stitching location is spaced apart from said first stitching location by about 180 degrees around said circular stitching section.

7. An apparatus as set forth in claim 6 wherein said circular stitching section has a diameter of about 200 millimeters.

8. An apparatus as set forth in claim 7 wherein said tether is made from a single piece of fabric material.

* * * * *